United States Patent
Bonardi et al.

(10) Patent No.: US 9,221,933 B2
(45) Date of Patent: Dec. 29, 2015

(54) PROCESS FOR PREPARING HALOGENATED POLYMERS

(71) Applicant: ARKEMA FRANCE, Colombes (FR)

(72) Inventors: Christian Bonardi, Saint Genis Laval (FR); Isabelle Tartarin, Lyons (FR); Thierry Pascal, Oullins (FR); Fabrice Gilis, Shanghai (CN)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/374,076

(22) PCT Filed: Jan. 4, 2013

(86) PCT No.: PCT/FR2013/050016
§ 371 (c)(1),
(2) Date: Jul. 23, 2014

(87) PCT Pub. No.: WO2013/110865
PCT Pub. Date: Aug. 1, 2013

(65) Prior Publication Data
US 2015/0038659 A1    Feb. 5, 2015

(30) Foreign Application Priority Data

Jan. 24, 2012 (FR) .................................... 12 50656

(51) Int. Cl.
| | | |
|---|---|---|
| C08F 114/06 | (2006.01) | |
| C08F 14/06 | (2006.01) | |
| C08F 214/06 | (2006.01) | |
| C08F 2/42 | (2006.01) | |
| C08K 3/16 | (2006.01) | |

(52) U.S. Cl.
CPC ................. *C08F 114/06* (2013.01); *C08F 2/42* (2013.01); *C08F 14/06* (2013.01); *C08F 214/06* (2013.01); *C08K 3/16* (2013.01)

(58) Field of Classification Search
CPC .................................................... C08F 114/06
USPC ................................................. 526/209, 211
See application file for complete search history.

(56) References Cited

U.S. PATENT DOCUMENTS

| | | | |
|---|---|---|---|
| 3,222,334 A | 12/1965 | Demme | |
| 4,749,757 A | 6/1988 | Schram et al. | |
| 6,121,390 A | 9/2000 | Shimizu et al. | |
| 6,340,729 B1 * | 1/2002 | Bonardi et al. | ........... 526/83 |
| 6,723,255 B2 * | 4/2004 | Buszta et al. | ........... 252/182.11 |
| 2004/0132930 A1 | 7/2004 | Bonardi et al. | |

FOREIGN PATENT DOCUMENTS

| | | |
|---|---|---|
| EP | 1083185 | 3/2001 |
| WO | WO 98/51714 | 11/1998 |
| WO | WO 2010/084130 | 7/2010 |

OTHER PUBLICATIONS

International Search Report of Corresponding PCT/FR2013/050016, Issued Feb. 27, 2013.
Anonymous: "Polyvinylchloride (PVC)", Polymers and Plymer Prcessing, Jun. 30, 2010, XPOO2674185, BASF, Retrieved Fro the Internet: URL:http://www.performancechemicals.basf.com/ev-wcms-in/internet/en_GB/portal/show-content_cps_co/content/EV/EV1/new/polymer-processing/polyvinylchloride/polyvinylchloride [retrieved on Apr. 18, 2011].

* cited by examiner

*Primary Examiner* — Robert Harlan
(74) *Attorney, Agent, or Firm* — Ratnerprestia

(57) ABSTRACT

The invention concerns a process for the aqueous suspension, micro-suspension, emulsion or micro-emulsion polymerization of at least one halogenated monomer, in particular chlorinated, for example vinyl chloride, by itself or with one or more other vinyl monomers, preferably less than 50% by weight of one or more other vinyl monomers, in which at least one shortstopper and at least one perhalogenate, acting as a whitening agent, are added.

The invention also concerns the use of an association of at least one shortstopper and at least one perhalogenate, acting as a whitening agent, in reactions for the polymerization of halogenated monomers.

The invention further concerns compositions comprising at least one shortstopper and at least one perhalogenate.

22 Claims, No Drawings

PROCESS FOR PREPARING HALOGENATED POLYMERS

CROSS REFERENCE TO RELATED APPLICATIONS

This application is the U.S. National Phase application of PCT International Application No. PCT/FR2013/050016, filed Jan. 4, 2013, and claims priority to French Patent Application No. 1250656, filed Jan. 24, 2012, the disclosures of each are incorporated by reference in their entirety for all purposes.

The invention relates to a polymerization process, in particular a process for aqueous suspension or emulsion polymerization, in order to produce halogenated polymers, in particular halogenated vinyl polymers, such as polyvinyl chloride (PVC) and PVC copolymers, for example, produced with improved colours, in particular with a high white index, said process using combinations of shortstoppers such as N-substituted hydroxylamines, for example.

In the manufacture of such halogenated vinyl polymers, in particular polyvinyl chloride, it is commercially important to obtain the best yield and the best quality at the lowest cost. The cost and the performance of both polymerization initiators and shortstoppers can be significant factors in controlling the yield and quality of the product obtained.

Ideally, halogenated vinyl polymers and copolymers, in particular PVC, should be produced with shortstoppers and efficient polymerization initiators, which are cheap and non-toxic. Currently, a number of shortstoppers exist which can be used in such polymerization reactions, including those with a hydroxylamine structure. They have been shown to perform well in stopping the radical polymerization of monomers, but there is still room for improvement as regards obtaining an even whiter resin colour that is less thermally degraded during the transformation process, in particular for polymerizations using energetic radicals.

Occasionally, yellowing of the polymers has been observed, in particular after they have been shaped or transformed by extrusion, injection, moulding or calendering, and other heat treatments. This is particularly true in the case in which certain polymerization initiators are used, in particular initiators employing peroxide radicals.

As an example, di(2-ethylhexyl) peroxydicarbonate and di(sec-butyl) peroxydicarbonate, sold by Arkema with trade names Luperox® 225 and Luperox® 223, are two initiators which are well known to the skilled person, which are cheap and which have high efficiency, but in some cases produce PVC with undesirable colourations (after shaping or transformation), in particular when they are used with commercial shortstoppers which are known and in routine use.

Examples of shortstoppers which are in routine use for the aqueous suspension polymerization of vinyl chloride are ATSC (acetone-thiosemicarbazone), bisphenol A (4,4'-isopropylidene-diphenol), sodium nitrite, α-methylstyrene, butylhydroxyanisole, butylhydroxytoluene, Irganox® 245 (2,4-dimethyl-6-sec-hexadecylphenol), by itself or as a mixture with Irganox® 1076 [octadecyl-3-(3,5-di-tert-butyl-4-hydroxyphenyl)propionate]. Irganox® 1141 (hereinafter IGX 1141) is a commercial mixture of 80 parts by weight of Irganox® 245 and 20 parts by weight of Irganox® 1076.

Compounds with a hydroxylamine structure are also known in the industry as shortstoppers for the synthesis of PVC, however most tests have indicated that N,N-diethylhydroxylamine (DEHA) by itself, even when used in high concentrations, can neither improve whitening of the resin nor improve the thermal stability after transforming said resin and thus does not always produce a satisfactory white index.

U.S. Pat. No. 3,222,334 already discloses that N,N-dialkylhydroxylamines could be used to stop the emulsion polymerization of vinyl chloride. However, none of the examples can be used to indicate any particular advantage in using these N,N-dialkylhydroxylamines. That document suggests that N,N-dialkylhydroxylamines have a non-toxic and non-decolourizing nature, but only with reference to use in various rubbers, and no distinction can be established between non-discolouration and stabilization of the colour.

International application WO 1998/051714 describes the use of ethyl hydroxylamine as a shortstopper, also having a "surprising non-volatility" as well as low corrosivity and good solubility in water.

However, although it claims the use of such shortstoppers for all radical polymerizations, that international application only discusses the emulsion polymerization of rubbers, and all of the examples illustrate the polymerization of such polymers.

U.S. Pat. No. 4,749,757 describes the use of DEHA (and other polymerization inhibitors) in association with a suspension agent, polyvinyl alcohol (PVA), to simultaneously increase the density and porosity of the PVC, by keeping a low concentration (5 ppm to 10 ppm) in the reactor. However, DEHA is not presented as being a shortstopper for PVC.

In document JP 02235912, Kanolo et al describe a "product of reaction between DEHA, cyclopentadiene and pyrogallol" which, when applied to the walls of the reactor, prevents the formation of scale. That document concerns a known application which exploits the properties of hydroxylamines in coatings in order to provide the walls of the polymerization reactors for the manufacture of PVC with anti-scaling properties.

U.S. Pat. No. 6,340,729 describes the use of DEHA with certain initiators of the organic peroxide type to improve the colour and thermal stability of PVC. That patent compares the use of DEHA with other shortstoppers in routine use and discusses the use of an excess of shortstopper, resulting in yellowing of the polymer.

The use of DEHA as an agent that can "kill" the polymerization initiator in order to stop runaway of the vinyl chloride polymerization reaction is also known in the art. Because of its excellent and rapid solubility in water, DEHA is effective in stopping the polymerization of vinyl chloride when, for example, an unexpected power cut occurs or mechanical problems arise which cause a breakdown in the agitation system.

International application WO 2010/084130 describes systems associating a hydroxylamine derivative with low concentrations of wholly or partially sterically hindered antioxidant phenolic compounds in order to obtain low colour polyvinyl chloride. However, such a system has been tested in order to obtain resins with a very high degree of whiteness using standardized tests which are considered to be stringent; there is still room for improvement.

One object of the present invention concerns the preparation of halogenated polymers and copolymers, in particular PVC, which have good whiteness properties and an absence of colouration, or at least a very weak colouration, and which have only a little or no yellowing after shaping or transformation of said polymers.

In fact, under certain conditions, in particular for transformation or shaping, halogenated polymers and copolymers, in particular PVC, prepared using known prior art processes may have colouration, usually yellowing, which may mean that the quality is not sufficient for the envisaged uses.

The inventors have now discovered, surprisingly, that it is possible to prepare halogenated vinyl polymers, in particular PVC, with very good whiteness properties, in particular stability of the white index.

In the present invention, it has been discovered that the use, during the preparation of halogenated polymers and copolymers, in particular PVC, of an association of at least one shortstopper with at least one perhalogenate, for example a metal, an alkali metal or an alkaline-earth metal perhalogenate, means that halogenated polymers and copolymers, in particular PVC, can be obtained with good whiteness and white index stability properties.

Thus, in a first aspect, the present invention concerns the use of an association of at least one shortstopper with at least one perhalogenate, for example a metal, alkali metal or alkaline-earth metal perhalogenate, in the process for the preparation of halogenated polymers and copolymers, in particular PVC. This use means that halogenated polymers and copolymers, in particular PVC, can be obtained with good whiteness and with stable white index properties.

In a further aspect, the invention concerns a process for the aqueous suspension, micro-suspension, emulsion or micro-emulsion polymerization of at least one halogenated monomer, in particular chlorinated, for example vinyl chloride, by itself or with one or more other vinyl monomers, preferably less than 50% by weight of one or more other vinyl monomers, in which at least one shortstopper and at least one perhalogenate, acting as a whitening agent, are added.

More precisely, the present invention concerns the process for the preparation of a halogenated polymer or copolymer, comprising at least the following steps:
a—preparing an aqueous suspension, micro-suspension, emulsion or micro-emulsion of at least one halogenated monomer, by itself or with one or more other vinyl monomers, preferably less than 50% by weight of one or more other vinyl monomers;
b—carrying out the polymerization reaction;
c—stopping polymerization by adding at least one shortstopper to the polymerization medium;
d—adding at least one perhalogenate as a whitening agent before, during or after step c for stopping polymerization; and
e—draining and drying the polymer or copolymer obtained.

In the above polymerization or copolymerization process, the polymerization step is advantageously carried out in the presence of at least one polymerization initiator, said polymerization reaction preferably being carried out at a temperature above ambient temperature and below 100° C., preferably at a temperature in the range 45° C. to 80° C., more preferably in the range 50° C. to 70° C.

The polymerization or copolymerization reaction is advantageously carried out until the degree of conversion of the starting monomer or monomers is in the range 60% to 90% by weight, preferably in the range 65% to 80%, after which at least one shortstopper is added.

The shortstopper which may be used in the process in accordance with the present invention may be of any type known to the skilled person; in particular, the shortstopper is advantageously selected from phenolic derivatives such as butylhydroxyanisole (BHA), butylhydroxytoluene (BHT), 2,4-dimethyl-6-sec-hexadecylphenol, octadecyl-3-(3,5-di-tert-butyl-4-hydroxyphenyl)propionate, by itself or as a mixture, and mono-alkyl-N- or dialkyl-N,N-substituted hydroxylamines, each alkyl radical containing 1 to 4 carbon atoms, for example di-ethylhydroxylamine, 4-OH-Tempo (1,4-dihydroxy-2,2,6,6-tetramethylpiperidine), as well as mixtures of two or more thereof in any proportions, for example mixtures of 2,4-dimethyl-6-sec-hexadecylphenol and octadecyl-3-(3,5-di-tert-butyl-4-hydroxyphenyl)propionate.

Particularly preferably, mono-alkyl-N- or di-alkyl-N,N-substituted hydroxylamines are used, each alkyl radical containing 1 to 4 carbon atoms, for example di-ethylhydroxylamine (DEHA), 4-OH Tempo (1,4-dihydroxy-2,2,6,6-tetramethylpiperidine), as well as mixtures of two or more thereof in any proportions, for example mixtures of 2,4-dimethyl-6-sec-hexadecylphenol, and octadecyl-3-(3,5-di-tert-butyl-4-hydroxyphenyl)propionate. DEHA is more particularly preferred as a shortstopper in the context of the present invention.

The perhalogenate used in the process of the present invention in association with at least one shortstopper can be used to obtain polymers endowed with a high white index. The perhalogenates which may be used may be of any type, in particular organic or mineral perhalogenates, preferably selected from metallic perhalogenates and alkali metal or alkaline-earth metal perhalogenates, highly preferably alkali metal or alkaline-earth metal perchlorates, and highly advantageously sodium perchlorate.

The process of the present invention may also advantageously comprise a step for introducing at least one polymerization initiator. These polymerization initiator(s) is(are) well known to the skilled person and is(are) preferably selected from dialkyl peroxydicarbonates, peroxy-tert-alkanoates, diacyl peroxides and alkyl hydroperoxides, inter alia.

It has also been discovered that using at least one perhalogenate with at least one shortstopper with a hydroxylamine structure during the synthesis of halogenated polymers or copolymers offers an action which is rapid and effective in stopping polymerization, resulting in high yields of high quality polymers and copolymers at low cost and with a good white index, minimal colouration, or even an absence of colouration.

Hence, the overall cost of PVC production may be substantially reduced by using at least one association in accordance with the present invention, i.e. at least one shortstopper and at least one perhalogenate.

In a preferred embodiment, the present invention concerns the process for synthesizing halogenated vinyl polymers and copolymers using an association of at least one shortstopper with at least one perhalogenate and using at least one peroxide type initiator selected, for example, from dialkyl peroxydicarbonates, peroxy-tert-alkanoates, diacyl peroxides and alkyl hydroperoxides, by themselves or as a mixture of two or more thereof in any proportions.

In another aspect, the invention concerns improving the colour of extruded halogenated vinyl polymers and copolymers which have been shaped, transformed or extruded, for example by injection, moulding, calendering, and others, in particular extruded PVC, using an association of at least one shortstopper with at least one perhalogenate during the synthesis of said polymers or copolymers.

In yet another aspect, the invention concerns the aqueous suspension, aqueous micro-suspension or aqueous emulsion polymerization of vinyl chloride, by itself or as a mixture with one or more other vinyl monomer(s), the polymerization initiator comprising at least one organic peroxide, preferably selected from dialkyl peroxydicarbonates, peroxy-tert-alkanoates, diacyl peroxides and alkyl hydroperoxides and by using, as a shortstopper, at least one mono- or di-alkylhydroxylamine and at least one perhalogenate. The polymers or copolymers obtained thereby have excellent whiteness.

In yet another implementation, the present invention concerns the combination of an initiator system comprising at least one compound selected from dialkyl peroxydicarbonates, peroxy-tert-alkanoates, diacyl peroxides and alkyl hydroperoxides and at least one shortstopper, for example comprising at least one N-mono-alkylhydroxylamine or N,N-dialkylhydroxylamine, and at least one perhalogenate, preferably at least one perchlorate, said combination not only being used to stop polymerization in an effective manner, but also to obtain, at the same time, a halogenated vinyl polymer or copolymer, for example PVC, with good whiteness properties, in particular good stability of the white index.

Thus, the invention provides a process for the aqueous suspension, micro-suspension, emulsion or micro-emulsion polymerization of vinyl chloride, by itself or as a mixture with at least 50% by weight of another vinyl monomer, in the presence of a polymerization initiator comprising at least one compound selected from dialkyl peroxydicarbonates, peroxy-tert-alkanoates, diacyl peroxides and alkyl hydroperoxides, in which process the polymerization formulation contains at least one shortstopper and at least one perhalogenate.

In another aspect, the invention also concerns an agent for regulating polymerization, comprising the combination described above of at least one shortstopper, for example an N-monosubstituted or N,N-disubstituted hydroxylamine, with at least one perhalogenate.

The initiator system used in the suspension or micro-suspension process is advantageously soluble in the monomer or monomers to be polymerized and is generally composed of one or more compounds which are capable of generating free radicals which trigger the reaction for the polymerization of said monomer or monomers. The initiator system used in the emulsion (or micro-emulsion) process is conventionally soluble in the aqueous phase and triggers the reaction for the polymerization of said monomer or monomers.

These free radicals generally result from the thermal decomposition of peroxy compounds; examples of these which may be cited include diacyl peroxides, dialkyl peroxydicarbonates, peroxy-tert-alkanoates and alkyl hydroperoxides.

In industrial practice, in order to express the quantity of initiator(s) introduced into the reaction mixture, the total quantity of active oxygen that can be released by the initiator system is expressed. The total quantity of active oxygen generally used is generally in the range 0.0005 part by weight to 0.01 part by weight, preferably in the range 0.0015 part by weight to 0.005 part by weight per 100 parts by weight of the monomer or monomers.

It is also possible to use a mixture of peroxy compounds, each of them having different half-lives, at a given temperature, the proportion of one with respect to the other possibly being from 1% to 99% by weight, preferably 10% to 90%. At identical temperatures, the higher the concentration of initiator(s), the faster the polymerization kinetics. Similarly, for a given polymerization time, the higher the reaction temperature, the faster the polymerization kinetics.

Industrial processes for polymerizing routinely used halogenated vinyl monomers are normally carried out in batch mode, and it is generally desirable to stop polymerization after reaching a predetermined degree of conversion of said monomer or monomers, in order to obtain a polymer with well-defined, unchanging characteristics. Typically, the degree of conversion of the monomer or monomers is in the range from approximately 60% to approximately 90% by weight.

Preferred dialkyl peroxydicarbonates which may be used as polymerization initiators are those in which each alkyl radical contains 1 to 16 carbon atoms, in a linear, branched or cyclic chain. Non-limiting examples of such dialkyl peroxydicarbonates are diethyl, di-isopropyl, di-n-propyl, dibutyl, di-sec-butyl, dicetyl, dimyristyl, di-(4-tert-butylcyclohexyl) and di-(2-ethylhexyl) peroxydicarbonates.

Preference is given to peroxydicarbonates in which each alkyl radical contains 6 to 16 carbon atoms; a more particularly preferred peroxydicarbonate is di-(2-ethylhexyl) peroxydicarbonate. The dialkyl peroxydicarbonates used in the context of the present invention are classified into the fast initiator family. They generally have a half-life of 1 hour at approximately 55° C. to 70° C. and may thus be used for vinyl chloride polymerization temperatures in the range 45° C. to 70° C.

Non-limiting examples of fast initiators which may also be used are peroxy-tert-alkanoates, 1,1-dimethyl-3-hydroxybutyl peroxy-neodecanoate, cumyl peroxy-neodecanoate, 1,1,3,3-tetramethylbutyl peroxy-neodecanoate and 1,3-di-(2-neodecanoylperoxyisopropyl)benzene, tert-butyl or tert-amyl peroxy-neodecanoate, tert-butyl peroxy-neoheptanoate, 1-(2-ethylhexamylperoxy)-1,3-dimethylbutyl peroxypivalate, 1,1,3,3-tetramethylbutyl peroxypivalate, and tert-amyl (or tert-butyl) peroxypivalate. Peroxy-tert-alkanoates are fast initiators which generally have a half-life of 1 hour at approximate temperatures in the range 40° C. to 75° C.

It is also possible to use di-iso-butyryl, di-(3,5,5-trimethylhexanoyl), dilauryl, didecanoyl or dibenzyl peroxides as non-limiting examples of fast initiators from the diacyl peroxide family; they have a half-life of 1 hour at temperatures in the range from approximately 39° C. to 92° C.

In an industrial aqueous suspension polymerization process carried out batchwise, it is generally desirable to stop polymerization after obtaining a predetermined degree of conversion so that a polymer with well-characterized, unchanging characteristics is obtained. It may also occasionally prove to be necessary to stop or at least slow down the reaction in the final polymerization phase, i.e. when conversion has reached values of more than 60% by weight, in order to avoid exothermic reactions at the end of the reaction which are difficult to control; generally, a shortstopper is used in order to stop the reaction.

Such shortstoppers are well known to the skilled person. The most frequently used examples for the polymerization or copolymerization of vinyl chloride which may be cited are ATSC (acetone-thiosemicarbazone), bisphenol A (4,4'-isopropylidenediphenol), sodium nitrite, α-methylstyrene, butylhydroxytoluene, butylhydroxyanisole, Irganox® 245 (2,4-dimethyl-6-sec-hexadecylphenol), by itself or as a mixture with Irganox® 1076 [octadecyl-3-(3,5-di-tert-butyl-4-hydroxyphenyl)propionate] and N,N-di-ethylhydroxylamine and its derivatives.

The hydroxylamine derivatives which may be used as shortstoppers advantageously have the formula HO—NR$^1$R$^2$, where R$^1$ and R$^2$ may be identical or different and are selected from hydrogen, hydrocarbon chains which may be linear or branched, saturated or unsaturated, containing 1 to 14 carbon atoms, each hydrocarbon chain possibly being substituted with one or more functional groups selected from —OH, —SO$_3$, benzyl, amino, mercapto, keto, carboxyl, or R$^1$ and R$^2$ may together form a cyclic structure (as in piperidinyloxy compounds), provided that at least one of R$^1$ and R$^2$ is other than H.

Mixtures of two or more of these shortstoppers may be used, including mixtures comprising at least one shortstopper as defined hereinabove and one or more other shortstoppers which are known to the skilled person. Examples which may be cited are mixtures of N,N-diethylhydroxylamine and bisphenol A.

The shortstopper, in particular substituted hydroxylamine, used in the process of the present invention is introduced in its entirety, preferably so as to obtain between 60% and 90% conversion of the monomer or monomers, preferably in the range 65% to 80% from the moment when the pressure starts to drop in the polymerization reactor. Thus, the quantity of shortstopper, in particular mono- or dialkylhydroxylamine, to be used may vary from 0.0005 to 0.1 parts by weight, preferably in the range 0.001 to 0.05 parts by weight per 100 parts by weight of the monomer or monomers to be polymerized.

The shortstopper which may be used in the context of the present invention is preferably selected from dialkylhydroxylamines, the most particularly preferred dialkylhydroxylamine being N,N-diethylhydroxylamine because of its solubility in water, the high yield induced by it, and the fact that it is widely commercially available.

The polymers which may be manufactured by the process of this invention include but are not limited to polyvinyl chloride. The invention may be applied in a similar manner to any halogenated polymer or halogenated copolymer, non-limiting examples of which that may be cited being polyvinylidene fluoride, polyvinyl fluoride, PTFE, and others.

In accordance with the present invention, at least one shortstopper is used in association with at least one alkali or alkaline-earth metal perhalogenate, the term "association" denoting a simultaneous, separated or sequenced introduction into the polymerization reaction medium.

This "association" may also include any type of additive routinely used by the skilled person, for example additives to improve the thermal stability of halogenated polymers.

The perhalogenates which may be used in the context of the present invention generally and usually have the formula $M(XO_4)_n$, in which X represents a halogen atom, M represents the counter-ion of the perhalogenate anion and the index n represents the valency of the counter-ion M; in general, n represents 1, 2 or 3.

The halogen atom X of the perhalogenate used in the present invention is selected from the fluorine atom (case of perfluorates), the chlorine atom (case of perchlorates), the bromine atom (case of perbromates) and the iodine atom (case of periodates). Particularly preferred perhalogenates in the present invention are perchlorates with the formula $M(ClO_4)_n$.

The counter-ion M may be of any type known to the skilled person, for example selected from metals, alkali metals, alkaline-earth metals, rare earths and others. More specifically, the counter-ion M is selected from lithium (Li), sodium (Na), potassium (K), magnesium (Mg), calcium (Ca), strontium (Sr), barium (Ba), zinc (Zn), aluminium (Al), lanthanum (La) and cerium (Ce). Clearly, mixtures of two or more perhalogenates may be used in the process of the present invention.

The perhalogenates may be used in the form of solutions or in the form of complexes with one or more alcohols (polyols, cyclodextrins), ether-alcohols or ester-alcohols. The ester-alcohols also include partial esters of polyols, examples of which that may be cited being mono-ethers of glycerol and mono-thioethers of glycerol. Still others are described in EP 0 394 547, EP 0 457 471 and WO 1994/24200.

The alcohols may also be polyhydric alcohols (or polyols), their dimers, trimers, oligomers and polymers such as, for example di-, tri-, tetra- and poly-glycols, as well as di-, tri- and tetra-pentaerythritols or vinyl alcohol polymers, irrespective of their degrees of polymerization. Other possible solvents for the perhalogenates that can be used in the process of the present invention are phosphates as well as cyclic and acyclic carbonates.

In this context, the perhalogenates, in particular perchlorates, may be used in a variety of forms, for example as they are in the form of salts or solutions in water and/or in one or more organic solvents, or indeed adsorbed onto a support material such as PVC, calcium silicates, zeolites or hydrotalcites, or they may be bonded, after chemical reaction, to at least one hydrotalcite, or to other compounds with a layered framework.

Particularly preferred perhalogenates are potassium, sodium and calcium perchlorates, more particularly preferably sodium perchlorate and/or potassium perchlorate. By way of example, in the context of the present invention it is possible to use sodium perchlorate, sold by Arkema, in solution at approximately 70% by weight in water.

The additives which may be used to improve the thermal stability are well known to the skilled person as thermal stabilizers or thermal co-stabilizers for halogenated polymers and may be used in association with or independently of the "shortstopper/perhalogenate" combination as described in the present invention. Such stabilizers or co-stabilizers have been described, for example, in WO 2006/058789.

Examples of additives which may be used to improve thermal stability which may be cited are mercaptocarboxylic acids, for example 2-ethylhexylmercapto-acetic acid and thioglycolic acid, as well as their esters; alkali metal carbonates, for example sodium carbonate; β-diketones; epoxidized vegetable oils, for example epoxidized soya oil, epoxidized linseed oil; phosphites; β-ketonic esters; metal salts or soaps, in particular stearates, for example calcium, barium and/or zinc stearate, adipates, for example disodium adipate; amino-uracil derivatives and/or thio-uracil derivatives; hydrazides; mineral compounds such as hydrotalcites or zeolites; alcohols and polyols, in particular alcohols obtained from saccharides; glycidyl derivatives, α-phenylindole; compounds of the dihydropyridine type such as those described in FR 2 429 806, EP 0 027 439 or WO 2002/092686, and specifically dihydropyridine and poly(dihydropyridine) derivatives, more particularly dihydro-1,4-dimethyl-2,6-dicarbododecyloxy-3,5-pyridine (Stavinor® D507, Arkema) or thiodi-ethanol-bis-(5-methoxy-carbonyl-2,6-dimethyl-1,4-dihydropyridine-3-carboxylate (Synesal® M, Lagor); enamines, for example those described in patent DE 10 118179; alkanolamine type derivatives; and others, by themselves or as mixtures of two or more thereof, in any proportions.

More particular polyol type thermal stabilizers and co-stabilizers which may be cited are polyols and alcohols obtained from disaccharides selected from penta-erythritol, dipenta-erythritol, tripenta-erythritol, trimethylolethane, trimethylolpropane, bis-trimethylolethane, bis-trimethylolpropane, cyclitols (including inositol), polyvinyl alcohols, hexitols (including sorbitol), maltitol, iso-maltitol, cellobiitol, lactitol, lycasin, mannitol, lactose, leucrose, tris(hydroxyethyl)isocyanurate, tris(hydroxypropyl)isocyanurate, palatinitol, tetramethylolcyclohexanol, tetramethylolcyclopentanol, tetramethylolcyclopyranol, xylitol, pentitols (including arabinitol), tetritols, glycerol, diglycerol, polyglycerol, thiodiglycerol and 1-O-α-D-glycopyranosyl-D-mannitol dihydrate. Of these, disaccharide alcohols are particularly preferred.

The hydrotalcites which may be used as co-stabilizers are well known to the skilled person and are described, for example, in DE 384 35 81, EP 0 062 813 and WO 1993/20135.

More specifically, the compounds belonging to the hydrotalcite family may be represented by the following general formula:

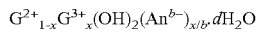
$$G^{2+}_{1-x}G^{3+}_{x}(OH)_2(An^{b-})_{x/b}\cdot dH_2O$$

in which
$G^{2+}$ represents one or more metals selected from the group comprising Mg, Ca, Sr, Zn and Sn;
$G^{3+}$ represents the aluminium atom (Al) or the boron atom (B);
An is an anion with valency n;
b is a number in the range 1 to 2, limits included;
$0<x<0.5$; and
d is a number in the range 0 to 300, limits included, preferably in the range 0.5 to 30, limits included;
and preferably, An is selected from $OH^-$, $ClO_4^-$, $HCO_3^-$, $CH_3COO^-$, $C_6H_5COO^-$, $CO_3^{2-}$, $(CHOHCOO)_2^{2-}$, $(CH_2COO)_2^{2-}$, $CH_3CHOHCOO^-$, $HPO_3^-$ and $HPO_4^{2-}$.

Examples which are entirely appropriate to the present invention are $Al_2O_3 6MgOCO_2 12H_2O$ (i), $Mg_{4.5}Al_2(OH)_{13}CO_2 3.5H_2O$ (ii), $4MgOAl_2O_3CO_2 9H_2O$ (iii), $4MgOAl_2O_3CO_2 6H_2O$, $ZnO3MgOAl_2O_3CO_2 8-9H_2O$ and $ZnO3MgOAl_2O_3CO_2 5-6H_2O$; of these, the most particularly preferred hydrotalcites are those with the above references i, ii and iii.

As indicated above, the anion of the hydrotalcites may be a perchlorate anion, and in this case represents a preferred embodiment of the invention. When the stabilization or co-stabilization additive is a hydrotalcite with a perhalogenate anion, in particular a perchlorate anion ($ClO_4^-$), it may advantageously be partially or totally substituted for the perhalogenates used as a whitening agent in association with the shortstopper in the process of the present invention.

The stabilizers or co-stabilizers may also be selected from zeolites which are known to the skilled person, in particular those with general formula $T_{x/n}[(AlO_2)_x(SiO_2)_y]\cdot wH_2O$, in which
T is an alkali or alkaline-earth metal, preferably selected from Li, Na, K, Mg, Ca, Sr and Ba;
n represents the charge of cation T;
y:x is a number in the range 0.8 to 15, limits included, preferably in the range 0.8 to 1.2, limits included; and
w is a whole number in the range 0 to 300, limits included, preferably in the range 0.5 to 30, limits included.

Advantageous examples of zeolites include sodium aluminosilicates of the A zeolite, sodalite, Y zeolite, X zeolite, LSX zeolite type; and zeolites prepared by partial or complete replacement of the sodium ions by the ions Li, K, Mg, Ca, Sr or Zn, as well as P, MAP zeolites, and other zeolites obtained after partial or total replacement of sodium ions by the ions Li, K or H, such as K—F zeolites, D zeolites and others.

Examples of phosphites (phosphorous triesters), thiophosphites and thiophosphates which may be cited are triphenylphosphite, diphenylalkylphosphites, phenyldialkylphosphites, tris(nonylphenyl)phosphite, trilaurylphosphite, trioctadecylphosphite, distearylpentaerythritoldiphosphite, tris(2,4-di-tert-butylphenyl)-phosphite, di-isodecylpentaerythritoldiphosphite, bis(2,4-di-tert-butylphenyl)penta-erythritoldiphosphite, bis(2,6-di-tert-butyl-4-methylphenyl)pentaerythritoldiphosphite, bis(isodecyloxy)penta-erythritoldiphosphite, bis(2,4-di-tert-butyl-6-methylphenyl)penta-erythritoldiphosphite, bis(2,4,6-tri-tert-butylphenyl)pentaerythritoldiphosphite, tristearylsorbitoltriphosphite, bis(2,4-di-tert-butyl-6-methylphenyl)methylphenyl)methyl-phosphite and bis(2,4-di-tert-butyl-6-methylphenyl)ethylphosphite.

Particularly preferred compounds are trioctyl-, tridecyl-, tridodecyl-, tritetradecyl-, tristearyl, trioleyl, triphenyl, tricresyl, tris-p-nonylphenyl- and tricylcohexyl-phosphites, more particularly preferably aryldialkyl- and alkyldiaryl-phosphites, and of these phenyldidecylphosphite, 2,4-di-tert-butylphenyldidodecylphosphite, 2,6-di-tert-butylphenyldidodecylphosphite and dialkyl- and diarylpentaerythritoldiphosphites, such as distearylpentaerythritoldiphosphite, as well as non-stoichiometric triarylphosphites with the composition, for example, $(H_{19}C_9—C_6H4)O_{1-5}P(OC_{12,13}H_{25,27})_{1.5}$ or $(H_8C_{17}—C_6H_4)O_2P(i-C_8H_{17}O)$ or even $(H_{19}C_9—C_6H_4)O_{1.5}P(OC_{9,11}H_{19,23})_{1.5}$.

Preferred organic phosphites are distearylpentaerythritoldiphosphite, trisnonylphenylphosphite and phenyldidecylphosphite. Other phosphites which may be used are phosphorous diesters (with the radicals defined above) and phosphorous mono-esters (with the radicals defined above), optionally in the form of their alkali metal, alkaline-earth metal, zinc or aluminium salts. These phosphorous esters may also be used as an "alumo-salt" compound as described in DE-A-403 18 18, for example.

Examples of β-diketones and β-keto-esters which may be used which can be cited are linear or cyclic 1,3-dicarbonyl compounds. It is preferable to use dicarbonyl compounds with the following formulae: $R'_1COCHR'_2—COR'_3$ in which $R'_1$ represents $C_1$-$C_{22}$-alkyl, $C_5$-$C_{10}$-hydroxyalkyl, $C_2$-$C_{18}$-alkenyl, phenyl, HO—, $C_1$-$C_4$-alkyl, $C_1$-$C_4$-alkoxy or phenyl substituted with halogen(s), $C_7$-$C_{10}$-phenylalkyl, $C_5$-$C_{12}$-cycloalkyl, $C_5$-$C_{12}$-cycloalkyl substituted with $C_1$-$C_4$-alkyl(s), or a —$R'_5$—S—$R'_6$ or —$R'_5$—O—$R'_6$ group, where $R'_2$ represents the hydrogen atom, $C_1$-$C_8$-alkyl, $C_2$-$C_{12}$-alkenyl, phenyl, $C_7$-$C_{12}$-alkylphenyl, $C_7$-$C_{10}$-phenylalkyl or a —CO—$R'_4$, group $R'_3$ is as defined for $R'_1$ or represents $C_1$-$C_{18}$-alkoxy, $R'_4$ is a $C_1$-$C_4$-alkyl or phenyl, $R'_5$ is a $C_1$-$C_{10}$-alkylene and $R'_6$ is a $C_1$-$C_{12}$-alkyl, phenyl, $C_7$-$C_{18}$-alkylphenyl or $C_7$-$C_{10}$-phenylalkyl.

Such compounds include the hydroxylated diketones described in EP 0 346 279 and the oxa- and thia-diketones described in EP 0 307 358, as well as the isocyanic acid keto-esters described in U.S. Pat. No. 4,339,383.

Examples of mercaptocarboxylic esters include the esters of thioglycolic, thiomalic, mercaptopropionic, mercaptobenzoic and thiolactic acids, mercaptoethyl stearate and mercaptoethyl oleate, such as those described in FR 2 459 816, EP 0 090 748, FR 2 552 440 and EP 0 365 483. The generic definition of mercaptocarboxylic esters also comprises esters of polyols and their partial esters, as well as their thioether derivatives. These molecules may also be latent mercaptides, such as those described in EP 0 945 485, for example.

Non-limiting examples of metallic soaps which may be used as stabilizers or co-stabilizers in the context of the present invention include metallic carboxylates of relatively long-chain carboxylic acids. Typical examples are stearates and laurates, as well as oleates and salts of shorter chain carboxylic acids. Alkylbenzoic acids are also included as examples of metallic soaps.

Examples of metals which may be cited are Li, Na, K, Mg, Ca, Sr, Ba, Zn, Al, La, Ce and the rare earths. It is often also possible to use those which are known to form synergistic mixtures, such as mixtures of barium/zinc, magnesium/zinc, calcium/zinc or calcium/magnesium/zinc stabilizers. The metallic soaps may be used by themselves or in mixtures. A list of the most commonly used metallic soaps is provided in "Ullmann's Encyclopedia of Industrial Chemistry", 5th Ed., Vol. A16 (1985), p. 361 ff. It is advantageous to use organometallic soaps belonging to the family of $C_2$-$C_{22}$ saturated aliphatic carboxylates, $C_3$-$C_{22}$ unsaturated aliphatic carboxylates, $C_2$-$C_{22}$ aliphatic carboxylates substituted with at least one OH group, cyclic and bicyclic carboxylates containing 5 to 22 carbon atoms, benzenecarboxylates, non-substituted or substituted with at least one —OH group and/or with a $C_1$-$C_{16}$ alkyl radical, naphthalenecarboxylates, non-substituted or substituted with at least one —OH group and/or with a $C_1$-$C_{16}$ alkyl radical, phenyl-$C_1$-$C_{16}$-alkylcarboxylates, naphthyl-$C_1$-$C_{16}$-alkylcarboxylates or phenolates, non-substituted or substituted with a $C_1$-$C_{12}$-alkyl radical, tallates and resinates.

Named examples which may be cited are zinc, calcium, magnesium or barium salts of monovalent carboxylic acids such as acetic, propionic, butyric, valeric, hexanoic, oenanthic, octanoic, neodecanoic, 2-ethylhexanoic, pelargonic, decanoic, undecanoic, dodecanoic, tridecanoic, myristic, palmitic, isostearic, stearic, 12-hydroxystearic, behenic, benzoic, p-tert-butylbenzoic, 3,5-di-tert-butyl-4-hydroxybenzoic, toluic, dimethylbenzoic, ethylbenzoic, n-propylbenzoic, salicylic, p-tert-octylsalicyclic and sorbic acids; the calcium, magnesium or zinc salts of divalent mono-esters of carboxylic acids such as oxalic, malonic, succinic, glutaric, adipic, fumaric, pentane-1,5-dicarboxylic, hexane-1,6-dicarboxylic, heptane-1,7-dicarboxylic, octane-1,8-dicarboxylic, phthalic, isophthalic, terephthalic and hydroxyphthalic acids; and the di- or tri-esters of tri- or tetra-valent carboxylic acids such as hemimellitic, trimellitic, pyromellitic or citric acids.

Particularly preferably, calcium, magnesium and zinc carboxylates obtained from carboxylic acids containing 7 to 18 carbon atoms (metallic salts in the narrow sense) are used such as, for example, benzoates or alkanoates, preferably stearates, oleates, laurates, palmitates, behenates, hydroxystearates, dihydroxystearates or 2-ethylhexanoates. Stearates, oleates and p-tert-butylbenzoates are particularly preferred. Overbasic carboxylates such as overbasic zinc octoate are also preferred. Similarly, overbasic calcium soaps are also preferred. If desired, it is also possible to use a mixture of carboxylates with different structures. In this case, compositions such as those described above, comprising an organozinc and/or organocalcium compound, are preferred.

Other mentionable typical examples of metallic soaps or salts which may be cited are bimetallic salts of dicarboxylic acids such as dilithium, disodium or dipotassium salts of divalent carboxylic acids such as oxalic, malonic, succinic, glutaric, adipic, fumaric, pentane-1,5-dicarboxylic, hexane-1,6-dicarboxylic, heptane-1,7-dicarboxylic, octane-1,8-dicarboxylic, phthalic, isophthalic or terephthalic acids. Disodium adipate is particularly preferred.

Other metallic stabilizers and co-stabilizers which may be cited are organometallic stabilizers, in particular organo-tin stabilizers. These may in particular be carboxylates, maleates, mercaptides and sulphides. Examples of such compounds are described in U.S. Pat. No. 4,743,640, U.S. Pat. No. 2,567,651, U.S. Pat. No. 2,598,936, U.S. Pat. No. 2,567,652, U.S. Pat. No. 6,174,941, U.S. Pat. No. 5,925,696, U.S. Pat. No. 6,156,830, U.S. Pat. No. 6,084,013, U.S. Pat. No. 6,194,494, U.S. Pat. No. 4,105,627, U.S. Pat. No. 4,352,903, and DE 2 427 853.

Particular examples of amino-uracils which may be mentioned are the structures described in U.S. Pat. No. 4,656,209, U.S. Pat. No. 5,859,100, U.S. Pat. No. 5,925,696 and U.S. Pat. No. 6,084,013.

The term "aqueous suspension or micro-suspension polymerization" means polymerization carried out in the presence of at least one initiator which is soluble in oil, and at least one unsaturated halogenated monomer, for example vinyl chloride by itself or as a mixture with another vinyl monomer, dispersed by any mechanical means in an aqueous medium comprising at least one suspending agent.

The proportion of vinyl monomer in the suspension is generally at least 50% by weight, preferably more than 80% with respect to the total weight of the suspension. A proportion of vinyl monomer of less than 50% by weight with respect to the total weight of the suspension may also, however, be envisaged in the context of the present invention.

The vinyl monomers which can be copolymerized in an aqueous suspension with a vinyl halide, in particular vinyl chloride, are well known to the skilled person; non-limiting examples of these which may be cited are vinyl esters such as vinyl acetate, vinylidene halides such as vinylidene chloride and vinylidene fluoride, acrylic esters such as butyl acrylate, and methacrylic esters such as methyl methacrylate.

The dispersion or suspension agents generally used in the suspension polymerization are also well known to the skilled person and are in particular selected from protective colloids, for example hydrosoluble polymers such as polyvinyl alcohols, polyethylene oxides, hydrosoluble cellulose derivatives such as methylcellulose, poly(vinylpyrrolidone), acetate copolymers of gelatine and vinyl/maleic anhydride and others, as well as mixtures of two or more of these in any proportions.

These suspension agents may be used by itself or in the form of mixtures in quantities generally in the range 0.01 to 0.5 part by weight, preferably in the range 0.04 to 0.2 part by weight per 100 parts by weight of monomer component(s).

The process of the present invention may also be carried out with a buffer system in order to control the pH of the reaction medium during polymerization. In fact, the pH of the aqueous medium is, for example, approximately 6 to 7 at the start of the reaction and may fall to close to about 3.5 due to the production of hydrohalic acid, in particular hydrochloric acid, in the reaction medium. Thus, in the context of the invention, it is preferable, but not necessary, to buffer the aqueous suspension.

Typical buffer systems which may be used may include but are not limited to those comprising carbonate, bicarbonate, phosphate or citrates. The pH range of the buffer system is in the range 5 to 8, preferably in the range 5.5 to 7.5. The buffer system is generally used in a quantity in the range 0.01 to 0.2 part by weight, preferably in the range 0.02 to 0.1 part by weight per 100 parts by weight of monomer(s).

In another implementation, the process of the present invention may also employ at least one antioxidant which is added to the reaction medium, either at the start of the reaction or when the desired conversion has been reached. The at least one antioxidant may be introduced all at once or in several batches, or continuously into the reactor during the polymerization reaction.

Preferred antioxidants which are known to the skilled person which may be used in the process of the present invention are antioxidants containing phenolic groups, preferably sterically hindered phenolic groups; non-limiting examples are those selected from butylhydroxyanisole, butylhydroxytoluene, Irganox® 1076 from Ciba, Irganox® 245 from Ciba and Isonox® 132 (2,6-di-tert-butyl-4-sec-butylphenol) from Schenectady Chemical. The quantity of antioxidant may vary from 10 ppm to 1000 ppm, more preferably from 25 ppm to 300 ppm.

The polymerization reaction of the process of the present invention may be carried out at any temperature adapted to the suspension, micro-suspension, emulsion or micro-emulsion polymerization reaction, preferably in the range 45° C. to 80° C., more preferably in the range 50° C. to 70° C., which makes the use of a very wide variety of polymerization initiators possible. When the selected polymerization temperature is not very high (for example between 30° C. and 50° C.), it may prove to be useful to employ a combination of different initiators with half-lives in the selected temperature range comprising, for example, a combination of dialkyl peroxydicarbonate and an initiator from the peroxy-tert-alkanoates family, or a combination of different initiators from the peroxy-tert-alkanoate family comprising a peroxy-tert-alkanoate and a peroxy-tert-alkanoate.

When the selected polymerization temperature is slightly higher (between 55° C. and 65° C.), it may be useful to employ a combination of different initiators with half-lives at the selected temperature comprising, for example, a dialkyl peroxydicarbonate and an initiator from the peroxy-tert-dialkanoates family, or a combination of peroxy-tert-alkanoates.

The peroxy-tert-alkanoates cited above generally have a half-life of 1 hour between 40° C. and 75° C. and may thus be used for vinyl chloride polymerization temperatures in the range 50° C. to 70° C. Non-limiting examples of these peroxy-tert-alkanoates which may be cited are tert-butyl and tert-amyl peroxy-tert-alkanoates.

In the case of a relatively high polymerization temperature (between 62° C. and 70° C.), it may be useful to employ a combination of different initiators with half-lives at the selected temperature comprising, for example, a dialkyl peroxydicarbonate or a peroxy-tert-alkanoate and a slow initiator (long half-life) from the diacyl peroxide family, such as dilauroyl peroxide.

The process of the invention may be carried out using any method which is known to the skilled person consisting, for example, of dissolving a protective colloid in an aqueous medium or a monomer, of dispersing the liposoluble polymerization initiator in the aqueous medium or of dissolving it in the monomer component and optionally of dissolving a buffer system in order to regulate or control the pH of the reaction medium.

Traces of oxygen are advantageously eliminated in order to result in a residual quantity of dissolved oxygen in the water in the range 0.0005 to 0.05 part by weight, preferably in the range 0.001 to 0.02 part by weight, per 100 parts by weight of water. The at least one monomer to be polymerized is then introduced into the reactor, and the reaction mixture is agitated and brought to a temperature in the range 45° C. to 80° C., preferably in the range 50° C. to 70° C.

During the polymerization, it is not necessary to keep the pressure and the temperature of the reaction mixture constant. Increasing the programmed temperature either at the start or at the end of the polymerization cycle means that the rate of decomposition of the initiators and the degree of polymerization can be accelerated. If the temperature and the pressure are kept constant, the polydispersity of the molecular masses of the polymer chains is in the range 1.8 to 2.5. In the case of polymerization with programmed temperature gradients throughout polymerization, a polydispersity in the range 1.8 to 3.5 is observed. These elements are perfectly well known to the skilled person.

The polymerization reaction is terminated by exhaustion of the liquid monomer phase, which is characterized by a modification to the liquid monomer/vapour equilibrium and a drop in the reaction pressure. Just before the drop in reaction pressure, the conversion by weight of monomer is generally in the 65% to 85% range. When the desired degree of conversion has been reached, the shortstopper is introduced into the reactor in order to destroy or render inactive any residual traces of initiator.

Once polymerization is terminated, the polymer formed is separated from the aqueous medium and then drained and dried. The polymer obtained, in particular in the case of a suspension or micro-suspension process, is generally in the form of particles with a size which is generally in the range 80 µm to 250 µm.

In a preferred implementation of the invention, suspension polymerization of the vinyl chloride is carried out using methods which are well known to the skilled person employing, in an optimized manner, a quantity of initiator of the peroxydicarbonate type (or a mixture of initiators including peroxydicarbonate and "fast" perester), then polymerization is stopped by adding, during the pressure drop, a shortstopper of the alkylhydroxylamine type; the quantity thereof is based on an empirical relationship.

In the process of the present invention, it has been discovered that adding at least one perhalogenate with at least one shortstopper to the polymerization reaction medium means that a polymerization product is obtained which has excellent whiteness properties compared with the same polymerization products obtained without adding perhalogenate.

Adding at least one perhalogenate to the polymerization reaction medium may be carried out at the start, during or at the end of the polymerization reaction, preferably during or at the end of the reaction, more preferably at the end of the reaction.

When the at least one perhalogenate is added at the end of the reaction, it may be added before, during or after adding the shortstopper. More precisely, the perhalogenate or perhalogenates and the shortstopper or shortstoppers may be added simultaneously, sequentially or in a separate manner, preferably simultaneously.

The quantity of perhalogenate(s) added can vary widely, but in general it is preferable to add a quantity in the range 0.1 to 10 mol of perhalogenate(s) per 1 mol of shortstopper; preferably, this quantity is in the range 0.5 to 5 mol, more preferably in the range 0.5 to 2 mol. Entirely satisfactory whiteness properties are, for example, obtained using one mole of perhalogenate(s) per mole of shortstopper.

In a more preferred implementation, the peroxide used is di-2-ethylhexyl peroxydicarbonate, the shortstopper is a dialkylhydroxylamine, preferably N,N-diethylhydroxylamine (DEHA), and the perhalogenate is sodium perchlorate.

In accordance with yet another aspect, the present invention concerns a composition comprising at least one shortstopper and at least one perhalogenate, preferably at least one alkali metal or alkaline-earth metal perhalogenate.

This composition may advantageously be used in the processes for the polymerization and copolymerization of halogenated vinyl monomers as described above. This composition advantageously comprises at least one hydroxylamine derivative, for example diethylhydroxylamine, and at least one perhalogenate, for example sodium perchlorate.

The composition of the present invention may also comprise one or more additives and/or solvents, for example selected from water, alcohols, stabilizers and co-stabilizers (in particular the thermal stabilizers and co-stabilizers described above), colourants and other additives and solvents known to the skilled person.

A particularly preferred composition comprises, and more preferably consists of, at least one shortstopper, at least one perhalogenate, at least one thermal stabilizer and/or co-stabilizer selected from antioxidants, metallic salts, mercaptocarboxylic acids, beta-diketones, epoxidized oils, phosphites, aminouracil derivatives, mineral co-stabilizers, dihydropyridine type compounds, and water; as a non-limiting example, the composition of the invention comprises and preferably consists of diethylhydroxylamine, sodium perchlorate and water.

A composition which can be used to obtain PVC with excellent thermal stability and excellent whiteness generally comprises:

- 5% to 40% by weight of diethylhydroxylamine, preferably 10% to 30% by weight, for example approximately 20% by weight;
- 5% to 40% by weight of sodium perchlorate, preferably 10% to 30% by weight, for example approximately 20% by weight;
- optionally, up to 20% by weight of one or more stabilizers and/or co-stabilizers; and
- the complement to 100% by weight of water.

The following examples serve to illustrate the invention described above and are not intended to limit this invention to the precise embodiments described herein. Many other variations and modifications are possible in the light of the above description and said examples which follow.

EXAMPLE 1

Production of S-PVC (Suspension Process) (Comparative)

60 kg of demineralized water, 204.5 g of polyvinyl alcohol with a degree of hydrolysis of 88 mol %, 153.1 g of polyvinyl alcohol with a degree of hydrolysis of 72 mol %, 90.5 g of an aqueous solution (comprising 40% active matter) of polyvinyl alcohol with a degree of hydrolysis of 55 mol % and 549 g of an emulsion of di-(2-ethylhexyl) peroxydicarbonate comprising 60% active matter (Luperox™ 223 EN60H from Arkema) were introduced into a reactor with a capacity of 1200 liters. The components cited above were introduced, at ambient temperature and with agitation (100 rpm), into the 1200 L reactor which was provided with a three-arm turbine type agitator, a heating jacket, a baffle and a condenser.

After closing the reactor, it was placed under partial vacuum (6.66 kPa absolute) and the vacuum was maintained for 15 minutes. Agitation was then increased to 265 rpm and simultaneously, the pumps were switched on in order to inject 362 kg of vinyl chloride and 286 L of hot water at 95° C. The vinyl chloride injection period was measured at 12 min. The hot water injection period was measured at 15 min. The temperature when charging was complete was approximately 50° C.

The heating was regulated by circulating a cold water/hot water mixture with an adjusted temperature in the heating jacket so that the polymerization temperature of 56.5° C. was reached in 10 minutes. The moment when the polymerization medium reaches 56.5° C. is considered to be the start of polymerization (=time t0) and the pressure at that time (P0) is then taken as the reference.

After 5 minutes of polymerization (i.e. time t0+5 min), 200 kg of water was introduced continuously into the reactor at a constant flow rate of 75 kg/h to improve heat exchange while keeping the exchange surface of the heating jacket constant and to reduce the viscosity of the aqueous suspension.

After 7 minutes of polymerization (i.e. time t0+7 min), the condenser was actuated in order to carry out heat exchange and to keep the temperature in the reactor constant. Actuation of the condenser was linear in order to reach, in 30 minutes (i.e. time t0+37 min), a constant heat exchange rate of 20 000 kcal/h.

Exhaustion of the gas phase (monomer) in the reactor was manifested by a drop in pressure between 65% and 70% conversion. As soon as the pressure had dropped to 0.3 bar compared with P0, cooling of the polymerization medium by the condenser was stopped and the polymerization temperature increased. This increase was controlled by adjusting the cooling of the heating jacket. This control means that the temperature of the polymerization medium could be increased in a regular manner.

As soon as the temperature reached 65° C., polymerization was stopped. This last polymerization step until the temperature of 65° C. is reached is termed HK (heat kick). The end of HK corresponds to reaching this temperature of 65° C. Polymerization was then stopped by adding an aqueous 85% solution of diethylhydroxylamine (DEHA) which was injected into the reaction medium over 1 minute. The quantity added corresponded to 115 ppm by weight of DEHA with respect to the initial monomer weight. The reaction medium was held at 65° C. for 1 minute before being cooled. Rapid cooling of the medium was carried out using cold water injected into the heating jacket.

The residual monomer was then eliminated from the reaction medium using conventional techniques, for example by returning to atmospheric pressure (degassing), and the traces of monomer were then eliminated by degassing under a vacuum of 13.33 kPa at 50° C. (stripping).

The PVC slurry thus obtained was then drained using a rotary centrifuge. The moist PVC powder was then dried for 12 hours in a rotary dry air vacuum drier heated to 60° C. The dry PVC powder was then screened through a 500 μm mesh.

The white index (WI) of this resin was evaluated by measuring the WI using a Konica Minolta CM2500D colourimeter, in accordance with ISO standard 2470. A new white index WI for this heat treated resin was obtained using the same measurement technique.

The heat treatment was carried out using a crystallizer produced from borosilicate glass with an external diameter of 70 mm, a height of 40 mm and a mass of 45 g, containing 9.5 g to 10.5 g of PVC resin, in a ventilated Heraeus UT6 type forced convection oven. The oven was heated to a stable temperature of 160° C. The crystallizer was then placed in the centre of the oven and exposed to this temperature for 10 minutes.

The resin was then cooled in a dessicator and screened through a 250 μm mesh. The resin was ready for the post-heat treatment WI measurement.

EXAMPLE 2

Production of S-PVC (Suspension Process) (Comparative)

The polymerization was carried out as in Example 1, with the exception that at the end of HK, an aqueous 50% sodium perchlorate (NaClO$_4$) solution was injected into the reaction medium for 1 minute. The quantity added corresponded to 115 ppm by weight of NaClO$_4$ with respect to the initial monomer weight. The reaction medium was maintained at 65° C. for 1 minute before being cooled. Degassing, stripping, emptying, centrifuging, drying and screening were then carried out in the same manner as in Example 1 and the polymer resins obtained thereby were evaluated in the WI test using the same criteria.

EXAMPLE 3

Production of S-PVC (Suspension Process)

The vinyl chloride polymerization was carried out using the operating procedure of Example 1, but with the difference that instead of DEHA by itself, a mixture A composed of DEHA, sodium perchlorate and water was added in respective proportions by weight of 20/20/60. The quantity added corresponded to 575 ppm by weight of mixture A with respect to the initial monomer weight. The reaction medium was maintained at 65° C. for 1 minute before being cooled. Degassing, stripping, emptying, centrifuging, drying and screening were then carried out in the same manner as in Example 1 and the polymer resins obtained thereby were evaluated in the WI test using the same criteria.

EXAMPLE 4

Production of S-PVC (Suspension Process)

The vinyl chloride polymerization was carried out using the operating procedure of Example 1, but with the difference that after adding the DEHA, an aqueous sodium perchlorate solution was added. The quantity added corresponded to 115 ppm by weight of DEHA and 115 ppm by weight of NaClO4 with respect to the initial monomer weight. The reaction medium was maintained at 65° C. for 1 minute before being cooled. Degassing, stripping, emptying, centrifuging, drying and screening were then carried out in the same manner as in Example 1 and the polymer resins obtained thereby were evaluated in the WI test using the same criteria.

EXAMPLE 5

Production of S-PVC (Suspension Process)

The vinyl chloride polymerization was carried out using the operating procedure of Example 4, but with the difference that, instead of DEHA, an aqueous emulsion of Irgastab® PVC11EM was added. Irgastab® PVC11EM is considered to be a PVC polymerization shortstopper. The quantity added corresponded to 485 ppm by weight of Irgastab® PVC11EM with respect to the initial monomer weight. The aqueous solution of sodium perchlorate, corresponding to 115 ppm by weight of $NaClO_4$ with respect to the initial monomer weight, was still added, following the order of introduction of Example 4. The reaction medium was maintained at 65° C. for 1 minute before being cooled. Degassing, stripping, emptying, centrifuging, drying and screening were then carried out in the same manner as in Example 1 and the polymer resins obtained thereby were evaluated in the WI test using the same criteria.

EXAMPLE 6

Production of S-PVC (Suspension Process)

The vinyl chloride polymerization was carried out using the operating procedure of Example 4, but with the difference that, instead of DEHA, a solution of BHA (t-butylhydroxyanisole, CAS No. 25013-16-5), 20% by weight in ethanol, was added. This solution is considered to be a PVC polymerization shortstopper. The quantity added corresponded to 54 ppm by weight of BHA with respect to the initial monomer weight. The aqueous solution of sodium perchlorate, corresponding to 115 ppm by weight of $NaClO_4$ with respect to the initial monomer weight, was still added, following the order of introduction of Example 4. The reaction medium was maintained at 65° C. for 1 minute before being cooled. Degassing, stripping, emptying, centrifuging, drying and screening were then carried out in the same manner as in Example 1 and the polymer resins obtained thereby were evaluated in the WI test using the same criteria.

EXAMPLE 7

Production of S-PVC (Suspension Process)

The vinyl chloride polymerization was carried out using the operating procedure of Example 4, but with the difference that, instead of DEHA, a solution of Irganox® 1076 (octadecyl-3,5-di-tert-butyl-4-hydroxyhydrocinnamate, CAS No. 2082-79-3), 10% by weight in isododecane (CAS No. 31807-55-3), was added. The quantity added corresponded to 225 ppm by weight of Irganox® 1076 with respect to the initial monomer weight. The aqueous solution of sodium perchlorate, corresponding to 115 ppm by weight of $NaClO_4$ with respect to the initial monomer weight, was still added, following the order of introduction of Example 4. The reaction medium was maintained at 65° C. for 1 minute before being cooled. Degassing, stripping, emptying, centrifuging, drying and screening were then carried out in the same manner as in Example 1 and the polymer resins obtained thereby were evaluated in the WI test using the same criteria.

EXAMPLE 8

Production of S-PVC (Suspension Process)

A vinyl chloride polymerization was carried out using the operating procedure of Example 3, but with the difference that before closing the reactor and at the start, the antioxidant Irganox® 1076 (octadecyl-3,5-di-tert-butyl-4-hydroxyhydrocinnamate, CAS No. 2082-79-3), 10% by weight in isododecane (CAS No. 31807-55-3), was added. The quantity added corresponded to 225 ppm by weight of Irganox® 1076 with respect to the initial monomer weight. The operating procedure was then identical to that of Example 3. The polymer resins obtained thereby were evaluated in the WI test using the same criteria. This example shows that the antioxidant added at the start of polymerization has no influence on the action of the shortstopper and of the perhalogenate as regards the white index before and after heat treatment, and thus that conventional known antioxidants can also be used in the process of the invention.

EXAMPLE 9

Production of S-PVC (suspension process) (comparative)

A vinyl chloride polymerization was carried out using the operating procedure of Example 1, but with the difference that before closing the reactor and at the start, the antioxidant Irganox® 1076, 10% by weight in isododecane, was added. The quantity added corresponded to 225 ppm by weight of Irganox® 1076 with respect to the initial monomer weight. The operating procedure was then identical to that of Example 1. The polymer resins obtained thereby were evaluated in the WI test using the same criteria.

EXAMPLE 10

Production of S-PVC (Suspension Process) (Comparative)

A vinyl chloride polymerization was carried out using the operating procedure of Example 1, but with the difference that instead of DEHA, a solution of Irganox® 1076, 10% by weight in isododecane, was added. The quantity added corresponded to 225 ppm by weight of Irganox® 1076 with respect to the initial monomer weight. The operating procedure was then identical to that of Example 1. The polymer resins obtained thereby were evaluated in the WI test using the same criteria.

EXAMPLE 11

Production of S-PVC (Suspension Process)
(Comparative)

A vinyl chloride polymerization was carried out using the operating procedure of Example 1, but with the difference that instead of DEHA, a solution of BHA, 20% by weight in ethanol, was added. The quantity added corresponded to 54 ppm by weight of BHA with respect to the initial monomer weight. The operating procedure was then identical to that of Example 1. The polymer resins obtained thereby were evaluated in the WI test using the same criteria.

The WI whiteness index test produced the results shown in Table 1 below:

TABLE 1

| Example | Initial WI | WI after heat treatment |
|---------|------------|-------------------------|
| 1       | 96.7       | 77.4                    |
| 2       | 96.4       | 65.8                    |
| 3       | 97.0       | 85.2                    |
| 4       | 96.9       | 84.6                    |
| 5       | 96.2       | 80.0                    |
| 6       | 93.2       | 78.1                    |
| 7       | 96.1       | 76.2                    |
| 8       | 97.4       | 84.9                    |
| 9       | 96.9       | 77.4                    |
| 10      | 95.6       | 66.5                    |
| 11      | 93.1       | 70.3                    |

The invention claimed is:

1. Process for the aqueous suspension, micro-suspension, emulsion or micro-emulsion polymerization of at least one halogenated monomer by itself or with one or more other vinyl monomers, comprising adding at least one shortstopper and at least one perhalogenate, acting as a whitening agent.

2. Process according to claim 1, wherein the polymerization is carried out in the presence of at least one polymerization initiator.

3. Process according to claim 1, wherein the shortstopper is selected from phenolic derivatives and mono-alkyl-N- or dialkyl-N,N-substituted hydroxylamines, each alkyl radical containing 1 to 4 carbon atoms, as well as mixtures of two or more thereof in any proportions.

4. Process according to claim 1, wherein the at least one perhalogenate is an organic or mineral perhalogenate selected from metallic perhalogenates, alkali metal or alkaline-earth metal perhalogenates.

5. Process according to claim 1, further comprising initiating the polymerization with at least one polymerization initiator selected from dialkyl peroxydicarbonates, peroxy-tert-alkanoates, diacyl peroxides, and alkyl hydroperoxides.

6. Process according to claim 1, wherein the polymerization comprises adding an initiation system comprising at least one compound selected from dialkyl peroxydicarbonates, peroxy-tert-alkanoates, diacyl peroxides and alkyl hydroperoxides and the at least one shortstopper, wherein the shortstopper comprises at least one of N-mono-alkylhydroxylamine or an N,N-dialkylhydroxylamine, and the at least one perhalogenate.

7. Process according to claim 1, further comprising adding at least one thermal stability additive selected from the following thermal stabilizers or thermal co-stabilizers: 2-ethylhexylmercapto-acetic acid, thioglycolic acid, and esters thereof, alkali metal carbonates, β-diketones, epoxidized vegetable oils, phosphites, β-ketone esters, metallic salts or soaps, hydrazides, the mineral compounds hydrotalcites and zeolites, alcohols and polyols, glycidyl derivatives, a-phenylindole, compounds of the dihydropyridine type, enamines, and alkanolamine type derivatives, by themselves or as mixtures of two or more thereof, in any proportions.

8. A method of preparing a halogenated polymer or copolymer comprising adding at least one shortstopper and at least one perhalogenate.

9. The method according to claim 8, wherein the shortstopper is selected from phenolic derivatives and mono-alkyl-N- or dialkyl-N,N-substituted hydroxylamines, each alkyl radical containing 1 to 4 carbon atoms.

10. The method according to claim 9, wherein the shortstopper is selected from di-ethylhydroxylamine and 4-OH-Tempo (1,4-dihydroxy-2,2,6,6-tetramethylpiperidine), as well as mixtures of two or more thereof in any proportions.

11. Composition comprising at least one shortstopper and at least one perhalogenate.

12. Composition according to claim 11, wherein the shortstopper is diethylhydroxylamine and the perhalogenate is sodium perchlorate.

13. Composition according to claim 11, comprising:
5% to 40% by weight of diethylhydroxylamine;
5% to 40% by weight of sodium perchlorate;
optionally, up to 20% by weight of one or more stabilizers and/or co-stabilizers; and
the complement to 100% by weight of water.

14. Process according to claim 1, wherein the at least one halogenated monomer is chlorinated.

15. Process according to claim 1, wherein the at least one halogenated monomer comprises vinyl chloride.

16. Process according to claim 1, wherein the one or more other vinyl monomers comprises less than 50% by weight.

17. Process according to claim 1, wherein the at least one perhalogenate is chosen from alkali metal and alkaline-earth metal perchlorates.

18. Process according to claim 1, wherein the at least one perhalogenate comprises sodium perchlorate.

19. Process according to claim 7, wherein the at least one thermal stability additive is chosen from stearates, adipates, amino-uracil derivatives, and/or thio-uracil derivatives.

20. The method according to claim 8, wherein the at least one perhalogenate comprises a metal, alkali metal or alkaline-earth metal perhalogenate.

21. Composition according to claim 11, wherein the at least one perhalogenate is at least one alkali metal or alkaline-earth metal perhalogenate.

22. Composition according to claim 11, comprising:
10% to 30% by weight of diethylhydroxylamine;
10% to 30% by weight of sodium perchlorate;
optionally, up to 20% by weight of one or more stabilizers and/or co-stabilizers; and
the complement to 100% by weight of water.

* * * * *